United States Patent
Carter et al.

(10) Patent No.: US 8,758,135 B2
(45) Date of Patent: Jun. 24, 2014

(54) CHILD'S CAR SEAT ASSEMBLY ENABLING ACCESS TO GAMING AND COMMUNICATIONS

(75) Inventors: Ron Carter, Matthews, NC (US);
Daniel Bizzell, Davidson, NC (US);
Ryan Gorman, Charlotte, NC (US)

(73) Assignee: Revolutionary Concepts, Inc., Matthews, NC (US)

( * ) Notice: Subject to any disclaimer, the term of this patent is extended or adjusted under 35 U.S.C. 154(b) by 0 days.

(21) Appl. No.: 12/945,643

(22) Filed: Nov. 12, 2010

(65) Prior Publication Data

US 2011/0169308 A1   Jul. 14, 2011

Related U.S. Application Data

(63) Continuation-in-part of application No. 12/464,016, filed on May 11, 2009, now Pat. No. 8,016,676.

(60) Provisional application No. 61/052,235, filed on May 11, 2008.

(51) Int. Cl.
*A63F 13/00* (2014.01)

(52) U.S. Cl.
USPC .................. 463/39; 463/40; 463/42; 463/46; 297/219.12; 297/256.16

(58) Field of Classification Search
USPC ......... 464/39, 40, 42, 46; 297/219.12, 256.16
See application file for complete search history.

(56) References Cited

U.S. PATENT DOCUMENTS

| | | | | |
|---|---|---|---|---|
| 5,179,447 A | * | 1/1993 | Lain | 348/837 |
| 6,746,065 B1 | * | 6/2004 | Chan | 296/24.34 |
| 6,871,356 B2 | * | 3/2005 | Chang | 725/75 |
| 7,084,859 B1 | * | 8/2006 | Pryor | 345/173 |
| 2004/0008255 A1 | * | 1/2004 | Lewellen | 348/148 |
| 2004/0097288 A1 | * | 5/2004 | Sloate et al. | 463/42 |
| 2004/0242333 A1 | * | 12/2004 | Arakawa et al. | 463/47 |
| 2004/0259070 A1 | * | 12/2004 | Goodstein | 434/428 |
| 2006/0113342 A1 | * | 6/2006 | Hampton et al. | 224/409 |
| 2007/0176469 A1 | * | 8/2007 | Day | 297/153 |
| 2007/0247800 A1 | * | 10/2007 | Smith et al. | 361/683 |
| 2008/0080076 A1 | * | 4/2008 | Hutzel et al. | 359/871 |
| 2009/0006336 A1 | * | 1/2009 | Forstall et al. | 707/3 |

* cited by examiner

*Primary Examiner* — James S McClellan

(74) *Attorney, Agent, or Firm* — Tillman Wright, PLLC; Chad D. Tillman; Jeremy C. Doerre

(57) ABSTRACT

A child's car seat assembly includes built-in components enabling wireless gaming applications. A child's car seat assembly includes built-in components enabling two-way, person-to-person communications. A child's car seat assembly includes built-in components enabling both wireless gaming applications and two-way, person-to-person communications. The child's car seat assembly of the invention is intended for use with an infant or toddler.

10 Claims, 25 Drawing Sheets

910

CHILD'S CAR SEAT ASSEMBLY ENABLING ACCESS TO GAMING AND COMMUNICATIONS

CROSS-REFERENCE TO RELATED APPLICATION

The present application is a U.S. continuation-in-part patent application of, and claims priority under 35 U.S.C. §120 to, U.S. nonprovisional patent application Ser. No. 12/464,016, filed May 11, 2009, now U.S. Pat. No. 8,016,676 which nonprovisional patent application published as U.S. patent application publication no. 2009/0278390, which patent application and any patent application publications thereof are incorporated by reference herein, and which patent application is a U.S. nonprovisional patent application of, and claims priority under 35 U.S.C. §119(e) to, U.S. provisional patent application Ser. No. 61/052,235, filed May 11, 2008, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Young children spend a great deal of time riding in vehicles, and both parents and children appreciate apparatus and systems in which the children are entertained and otherwise distracted while riding in the vehicles. Such apparatus and systems include those that enable children to play video games and watch DVDs while riding in vehicles.

Patent references are known that appear to disclose such apparatus and systems. For instance, U.S. Pat. No. 7,126,583 appears to disclose a heads up display for projecting text and/or graphics into a field of view of an occupant of a vehicle. A processor and associated electrical architecture additionally appear to be disclosed.

U.S. Pat. No. 7,039,197 appears to disclose a user interface for use in a vehicle which allows occupants to use controls to create a recorded message and/or place a telephone call.

U.S. Pat. No. 6,947,071 appears to disclose a vehicle compartment monitor including a display, a camera, and a mechanism for relaying data from the camera to the display.

U.S. Pat. No. 6,535,137 appears to disclose a child safety seat with an alarm that is connected to the electrical system of a vehicle.

U.S. Patent Application Publication No. US2005/0067865 appears to disclose a chair combined with a plurality of audio-visual devices.

U.S. Pat. No. 7,201,444 appears to disclose a child's car seat having a reading light and a power switch.

U.S. Pat. No. 7,039,207 appears to disclose an entertainment and pacification system for a child's car seat having speakers with a plurality of audio sources.

U.S. Pat. No. 5,624,156 appears to disclose an entertainment system including a child's car seat, an audio source supported on the seat, speakers, and a video device interconnecting to the audio source.

U.S. Pat. No. 5,482,352 appears to disclose a child's seat having speakers and a compartment for an audio apparatus.

U.S. Pat. No. 5,464,381 appears to disclose a child's seat having speakers, a power switch, a volume control, and a tone control.

U.S. Pat. No. 4,979,777 appears to disclose a child's seat having a sound generating apparatus installed in the seat.

While the foregoing references appear to disclose inventions that adequately address the needs identified in such references, it is believed that a need continues for improved communication devices and systems that enable communications by a child retained within a car seat. This, and other needs, are addressed by one or more aspects of the present invention, although it will be appreciated that not every aspect necessarily addresses every need.

SUMMARY OF THE INVENTION

The present invention includes many aspects and features. Furthermore, while the present invention is described in the context of a seat assembly for installation and use in a vehicle (hereinafter "car seat assembly"), it will be appreciated that the invention is further applicable to a seat assembly that is used, for example, in the context of a stroller or carrier.

In one or more aspects, the invention broadly relates to a child's car seat assembly. Such a car seat assembly may comprise a child's car seat that includes built-in components. Alternatively, a car seat assembly may comprise a device including one or more components that is configured for attachment to a child's car seat and the child's car seat the device is attached to. In either case the components preferably enable: gaming applications which may include wireless gaming applications; and/or two-way, person-to-person communications. Such car seat assemblies are preferably intended for use with an infant or toddler.

Gaming

Generally, in an aspect of the invention, a child's car seat assembly includes communication components that are incorporated into the car seat assembly and that enable wireless gaming applications to be played by a child who is retained in the car seat assembly.

In features of this aspect, the communication components include a transceiver or, alternatively, a separate receiver and a separate transmitter; a speaker; a display; and controls for operating the components. The communication components further may include a microphone and a camera. The car seat assembly also preferably includes a processing unit for locally executing software at the car seat assembly.

The components preferably are built-in and form part of the car seat assembly. Furthermore, the display and controls may be combined such as, for example, in a touch screen display, whereby a graphical user interface (GUI) may be provided on the display itself.

The gaming applications that are played in accordance with this aspect of the invention preferably provide educational benefits to the child and include educational media that is interactive. The gaming applications may be hosted remotely from the car seat assembly.

The gaming applications may be downloaded on demand and executed locally at the car seat assembly. Additionally, it is contemplated that the gaming applications are not sophisticated and that each gaming application is designed to attract and hold the attention of a child who is retained in the car seat assembly.

In this respect, and in accordance with a further feature, the gaming applications that are provided are geared specifically toward the age of the child who typically uses the car seat assembly, and the set of gaming applications applicable to such child may be automatically updated periodically as the child ages. This feature may be provided in accordance with a subscription agreement with a third party that provides the gaming applications, and the age of the child can be identified and associated with the account at the time of the subscription.

Remotely hosted applications, and applications that are downloaded on demand, are accessed using the communications capabilities of the car seat assembly. Specifically, the communication components preferably enable radio communications over a satellite or cellular network. Alternatively, where a WiMax or similar network is present, the communication components may enable communications over such a network. In any case, protocols for such communications may include, for example, where applicable and as desired, the General Packet Radio Service (GPRS) protocol; the 3G protocol; the 4G protocol; Bluetooth; WiMax; a cellular protocol; the transmission control protocol (TCP), including TCP-IP protocol; and one or more 802.11 protocols. In one or more preferred implementations, a car seat assembly includes one or more local gaming applications that are installed, or pre-installed, on or at the car seat assembly.

In variations of this aspect, an audio, video, or audiovideo program can be presented to the child from local storage, and/or using the communications components, which program may or may not be interactive and which program may or may not be designed to specifically provide educational content to the child (as opposed to simply entertain the child). In some implementations, the audiovideo program is streamed to the car seat assembly and, in other implementations, the audiovideo program is downloaded to—and played from memory of a component of—the car seat assembly.

Two-Way Person-to-Person Communications

In another aspect of the invention, a child's car seat assembly includes communication components that are incorporated into the car seat assembly and that enable communications by a child retained in the car seat assembly.

In features of this aspect, the communication components include a transceiver or, alternatively, a receiver and a transmitter; a speaker; a microphone; a camera; a display; and controls for operating the components.

The components preferably are built-in and form part of the car seat assembly. Furthermore, the display and controls may be combined such as, for example, in a touch screen display.

This aspect of the invention enables two-way communications between a child seated in the car seat assembly and another person in the car, and/or a person who is remotely located, i.e., someone who is not in the vehicle. In features of this aspect, the two-way communications include audio communications; the two-way communications include video communications; and the two-way communications include both audio and video communications.

In a feature of this aspect, two-way communications between a child retained in the car seat assembly and another person is initiated by the child.

In a feature of this aspect, two-way communications between a child retained in the car seat assembly and another person is initiated by the other person.

In a feature of this aspect, the other person communicates with the child via a telephone. The telephone may be a landline phone, a VoIP phone, or a mobile phone.

The controls preferably are designed to be used by a child seated in the car seat assembly and may include a button that, when pressed by the child, connects the child to a particular adult such as the child's mother. A picture of the mother may be incorporated into the button, especially where the button is provided as part of a graphical user interface (GUI) on a touch screen display.

Additional Features of the Foregoing Aspects

In at least some preferred implementations, a car seat assembly is powered by a vehicle by plugging an adapter into a conventional outlet found in the vehicle. Alternatively, the car seat assembly includes a rechargeable power source, such as a rechargeable battery. The battery may be recharged using an adapter that is plugged into the vehicle, that is plugged into a conventional electrical socket of a building or house, or both. In still yet another variation, the car seat assembly is powered by conventional batteries that are removably inserted into a battery housing of the car seat assembly that is easily accessible, in which case the batteries may or may not be rechargeable since they are readily replaceable.

In at least some implementations, one or more speakers are located proximate the headrest of the car seat assembly, and the video display and the controls are housed within a cross bar of the car seat assembly. In this respect, the cross bar of the car seat assembly preferably rotates relative to the seat portion, by which the cross bar may be rotated to a forward position in which the video display and controls are generally located in front of, and are easily accessible by, a child retained in the seat. The video display and controls preferably are contained within a recess of such a cross bar of the car seat assembly such that no hazard is presented by a protracted display or controls. The cross bar further may be utilized as a handle by which an adult conveniently lifts and carries the car seat assembly.

In at least some preferred implementations, a child's car seat assembly is configured to play music, e.g. mood music.

It will also be appreciated that enabling communications by a child's car seat assembly in accordance with the foregoing aspects of the invention makes possible communication of an alarm from the car seat assembly to an appropriate adult. Such an alarm may be sounded by the child. Alternatively, or in addition thereto, such an alarm may be automatically sounded. Indeed, the car seat assembly preferably includes one or more sensors and monitoring circuitry for automatically communicating an alarm via the communications components when a predefined alarm condition is met. For example, the sensor may be a temperature sensor for detecting ambient temperature within the vehicle and for sensing the weight of a child retained within the car seat assembly; in turn, the monitoring circuitry can determine when a threshold temperature is reached with a child retained in the car seat assembly, and can consequently sound the alarm by initiating an appropriate communication.

The alarm communication can be sent to one or more designated telephone numbers and/or to one or more email addresses. The alarm communicated can be in the form of a prerecorded or computer synthesized message or in the form of a predefined text message, any of which can include the ambient temperature detected in the vehicle. One or more images taken with the camera of the communication components also may be included with the alarm that is communicated. The images may be in the form of still pictures or video. Additionally, audio may be included when video is transmitted in the communication of the alarm.

In auxiliary features of the foregoing aspects of the invention, the car seat assembly includes components that enable CD's to be listened to or DVD's to be watched by the child; and single-player games to be played on the display, for which games the software is located local to the car seat assembly. In these features, the wireless communication capabilities of the car seat assembly are not necessarily required in order for the child to listen to CDs, watch DVDs, or play standalone games.

In addition to the aforementioned aspects and features of the present invention, it should be noted that the present invention further encompasses the various possible combinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1A:
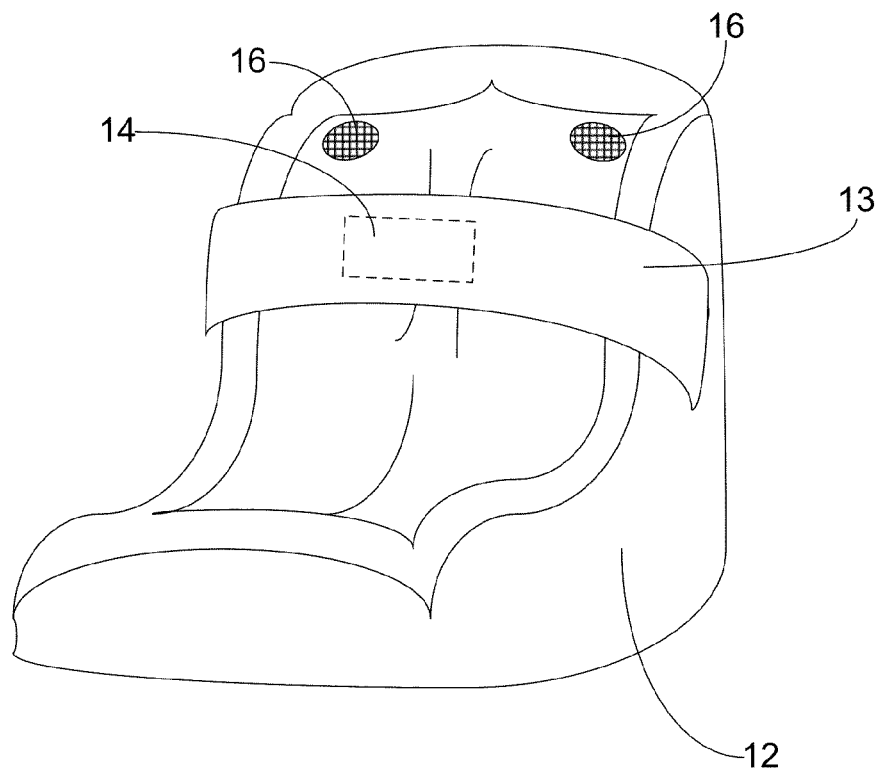
FIG. 1A is front perspective illustration of a child's car seat assembly in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the drawings, one or more preferred embodiments of the present invention are next described. The following description of one or more preferred embodiments is merely exemplary in nature and is in no way intended to limit the invention, its implementations, or uses.

FIG. 1A is a front perspective illustration of a child's car seat assembly 10 in accordance with a preferred embodiment of the present invention. The car seat assembly 10 includes a child's car seat 12, a cross bar 13, and communication components. Specifically, speakers 16 and an entertainment console 14 have been built into the child's car seat assembly 10 for wirelessly accessing various entertainment and educational media and enabling two-way communication. In at least one embodiment, the speakers 16 may be built into the cross bar 13 (see FIG. 3). The console 14 is illustrated with dotted lines to indicate that it is built into the side of the cross bar 13 that is out of view in FIG. 1A. The console 14 may be used to wirelessly play video games, access educational tools, watch various entertainment media such as movies and videos, access available web content, and enable two-way wireless communication between the occupant of the car seat assembly 10 and another person or device.

Figure 1B:
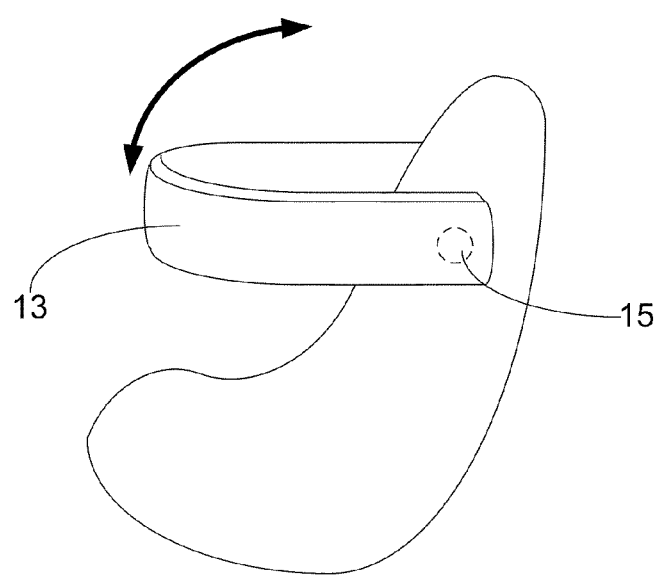
FIG. 1B is a side illustration of the child's car seat of FIG. 1A.

As can be seen best in FIG. 1B, the cross bar 13 has two distal ends. Each distal end is coupled to the car seat 12 along a rotational axis 15 such that the cross bar 13 may be freely rotated.

Figure 2A:
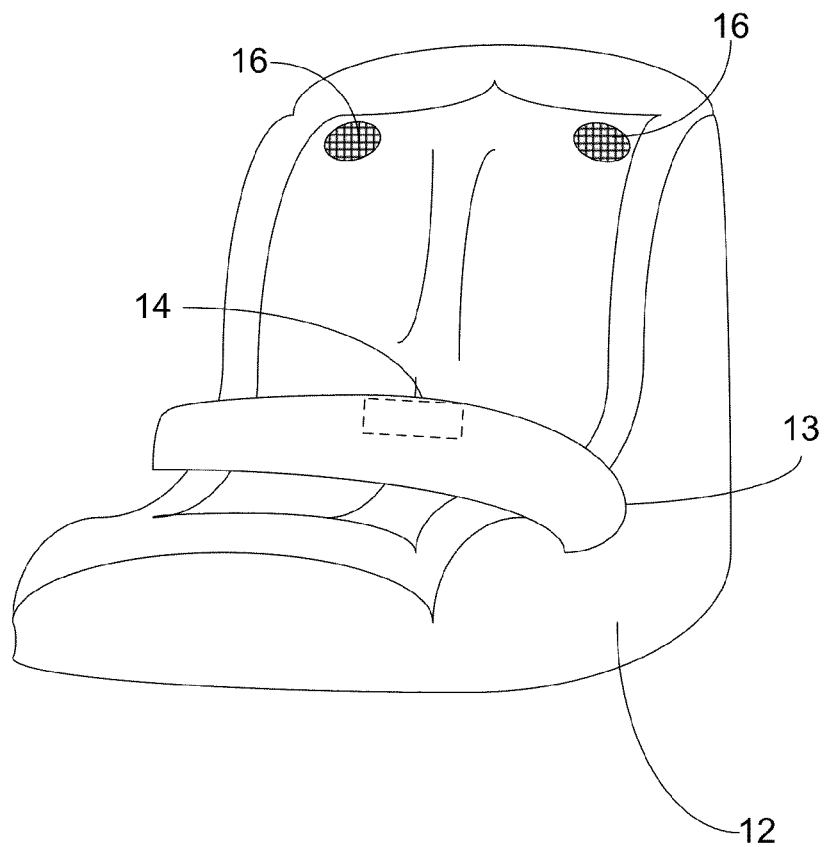
FIG. 2A is a front perspective illustration of an alternative location for a cross bar in accordance with a preferred embodiment of the present invention.
Figure 2B:
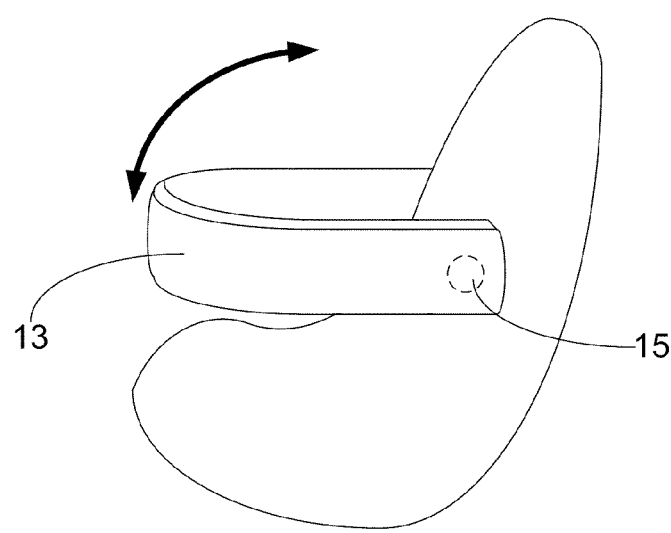
FIG. 2B is a side illustration of the child's car seat of FIG. 2A.

FIG. 2A is a front perspective illustration of an alternative configuration of a child's car seat assembly 110 in accordance with a preferred embodiment of the present invention. The console 14 is illustrated with dotted lines to indicate that it is built into the side of the cross bar 13 that is out of view in FIG. 2A. FIG. 2B illustrates how the cross bar 13 may be positioned along the rotational axis 15. Hereinafter, all references to the child's car seat assembly 10 shall additionally be construed as including the child's car seat assembly 110.

Figure 3:
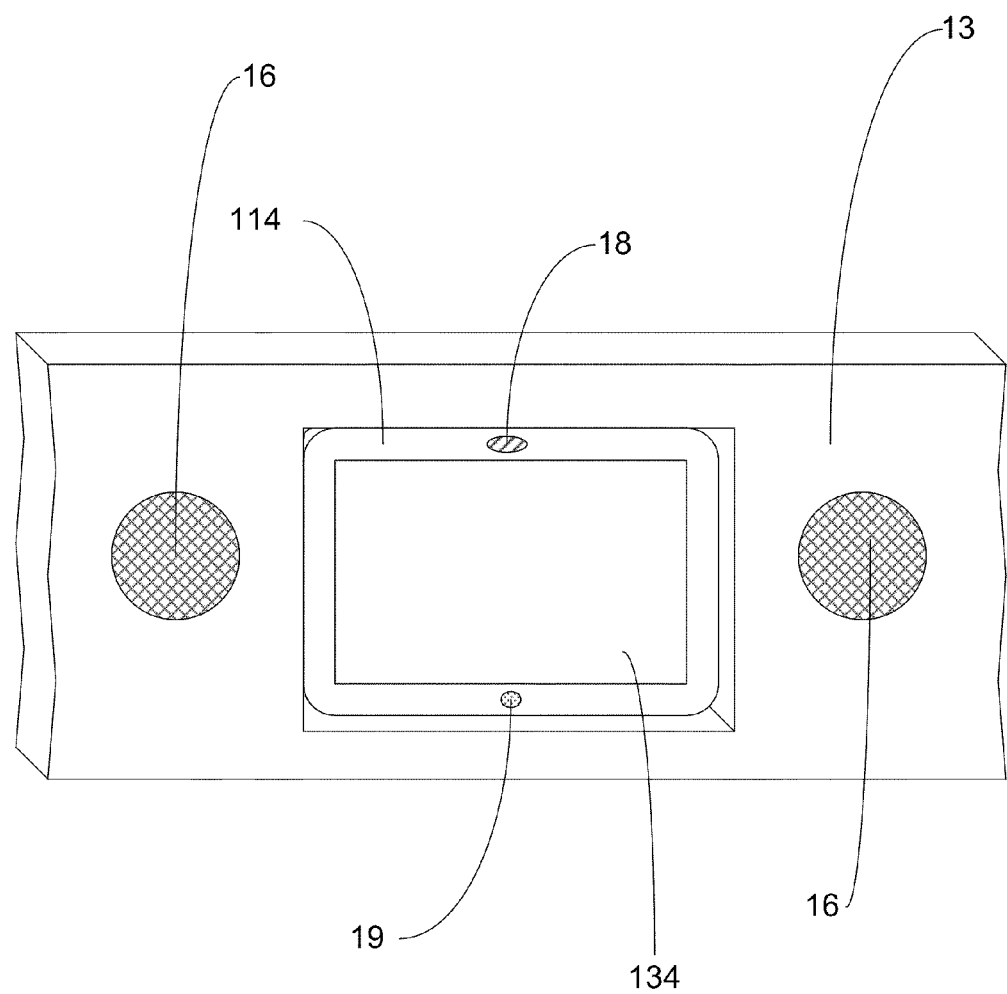
FIG. 3 is a fragmented illustration of a console embedded in the cross bar in accordance with a preferred embodiment of the present invention.

FIG. 3 is a fragmented illustration of a console 114 embedded in the cross bar 13 in accordance with a preferred embodiment of the present invention. The console 114 includes a touch screen display 134, a microphone 18, and a camera 19. In at least some embodiments of the present invention, the microphone 18 and/or camera 19 may be included in one or more different parts of the car seat assembly 10. In at least some preferred implementations, the camera 19, and/or associated software, is capable of providing night vision images. The console 114 is fully adjustable and tiltable in its arrangement with the cross bar 13.

Figure 4:
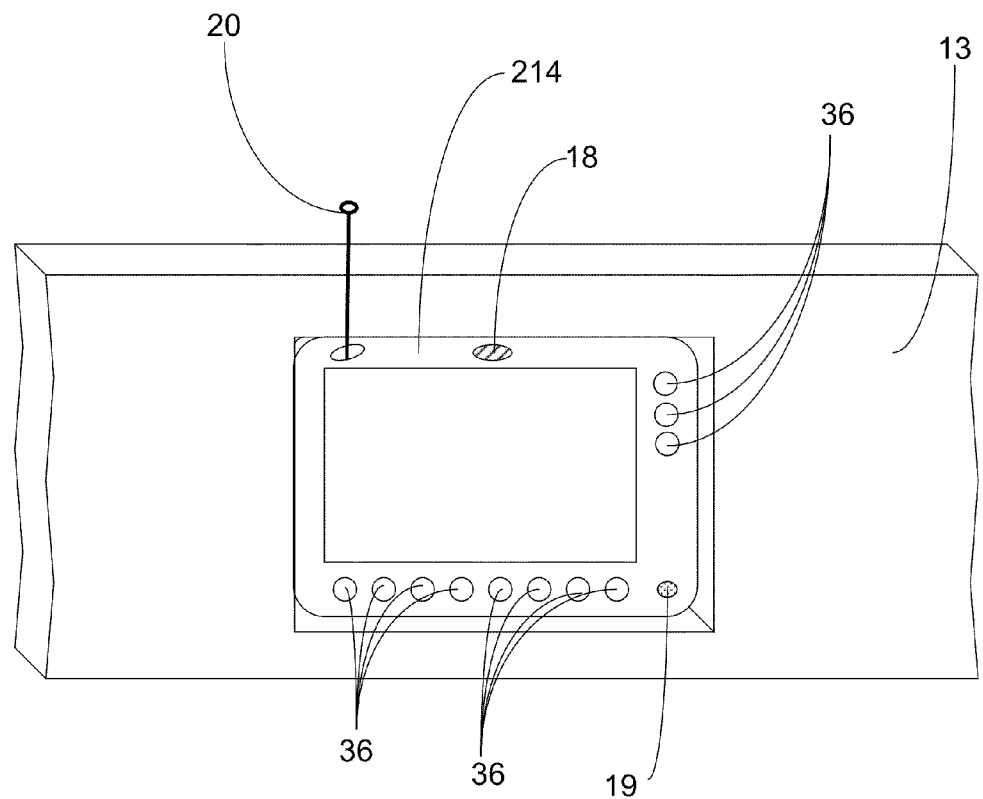
FIG. 4 is a fragmented illustration of an alternative console that may be embedded in the cross bar.

FIG. 4 is a fragmented illustration of an alternative console 214 that may be embedded in the cross bar 13. The console 214 includes a display 234, a microphone 18, a camera 19, an antenna 20 (schematically represented) for transmitting and receiving wireless signals, and a plurality of control buttons 36. The console 214 is fully adjustable and tiltable in its arrangement with the cross bar 13.

As will be appreciated, the console 214 is capable of receiving and displaying video content and receiving and presenting audio content in conjunction with displayed video content. The console 214 may also receive and present audio content without corresponding video content, e.g., in the case of providing a two-way communication function for a car seat assembly 10 occupant.

The plurality of control buttons 36 are used to control the operation of the console 14 for viewing and/or interacting with available media. In particular, it is contemplated that the console 214 may provide the ability to play a video game by using the function buttons 36 located on the console 214. The control buttons 36 may include right, left, up, and down arrow buttons to control relative movement on the display 34. The control buttons 36 also may include control buttons 36 for controlling various functions such as, for example, on/off, restart, play, etc. The Ordinary Artisan will understand that the control buttons 36 shown herein are exemplary only and control buttons 36 of any appropriate shape, size, and/or functionality may be provided. Accordingly, additional control buttons 36 can be added as appropriate. Further, the functionality of available control buttons 36 may change depending on the media being viewed, e.g., the buttons may have different functions for playing a video game than they do for watching a movie, or may have different functionality when playing different video games.

The display 34 is for viewing of the entertainment media being wirelessly accessed. It is preferred that the display 34 be flat. The viewed media may include a video game, educational content, a movie, a video, other available web content, and the like. The display 34 may also be used to display video of a person communicating with the seat occupant via a telephone call, e.g., a cellular call. As discussed above, the console 214 includes various control buttons 36 that may be utilized to control the media being viewed on the display 34. The control buttons 36 may also be used to control the communication functionality of the car seat assembly 10, e.g., making a call, disconnecting a call, and the like.

Figure 5A:
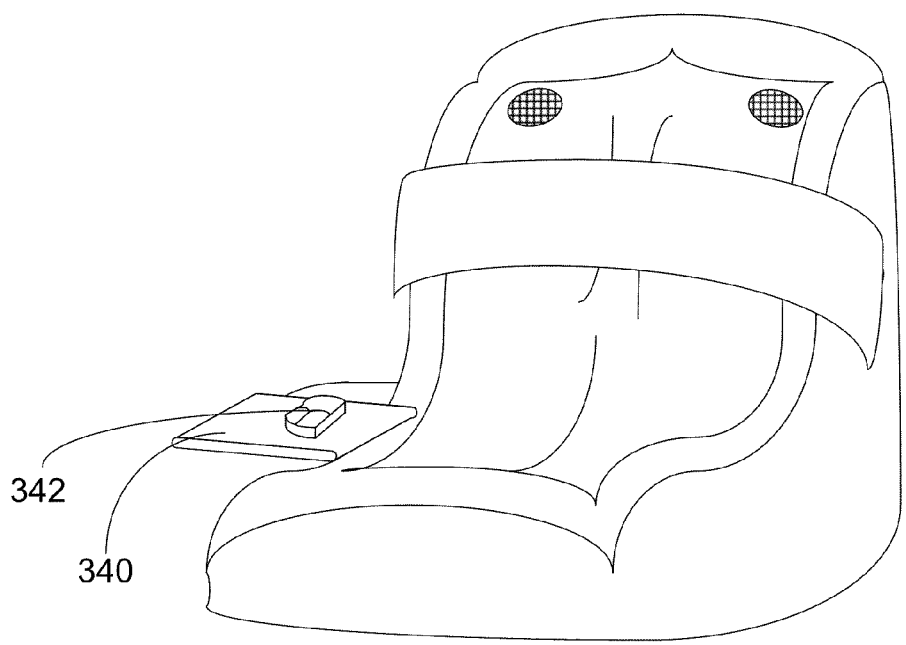
FIG. 5A is a front perspective illustration of a child's car seat assembly having a mousing surface for use with a mouse in accordance with preferred embodiment of the present invention.
Figure 5B:
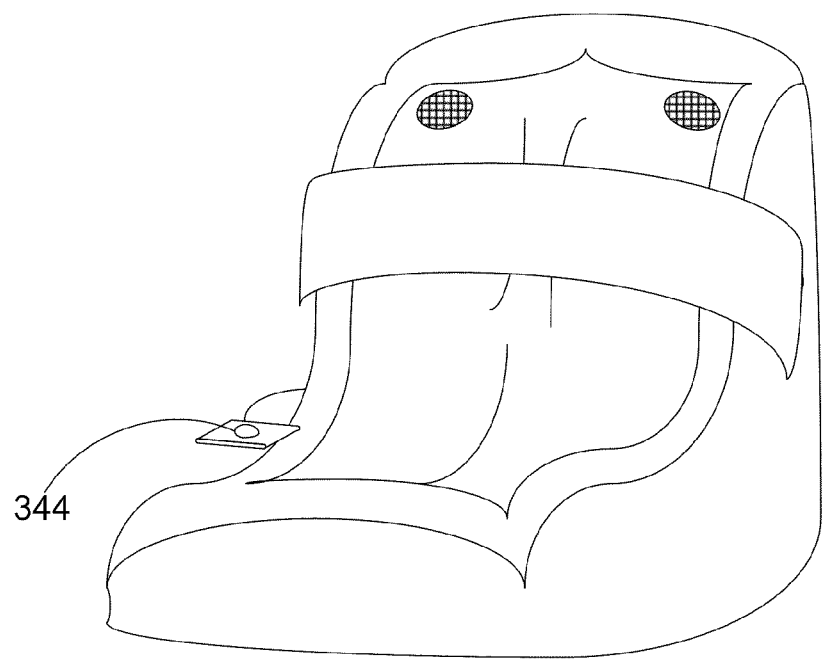
FIG. 5B is a front perspective illustration of a child's car seat assembly having a trackball attached to the car seat assembly.
Figure 5C:
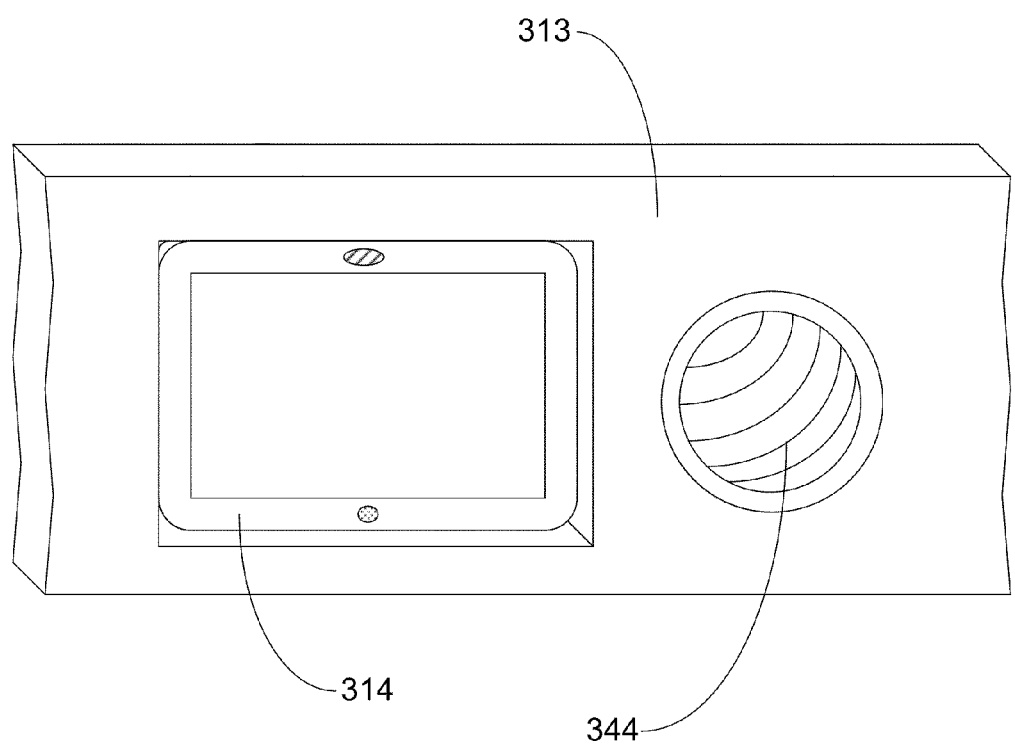
FIG. 5C is a fragmented illustration of a trackball attached to a cross bar of a child's car seat assembly.
Figure 5D:
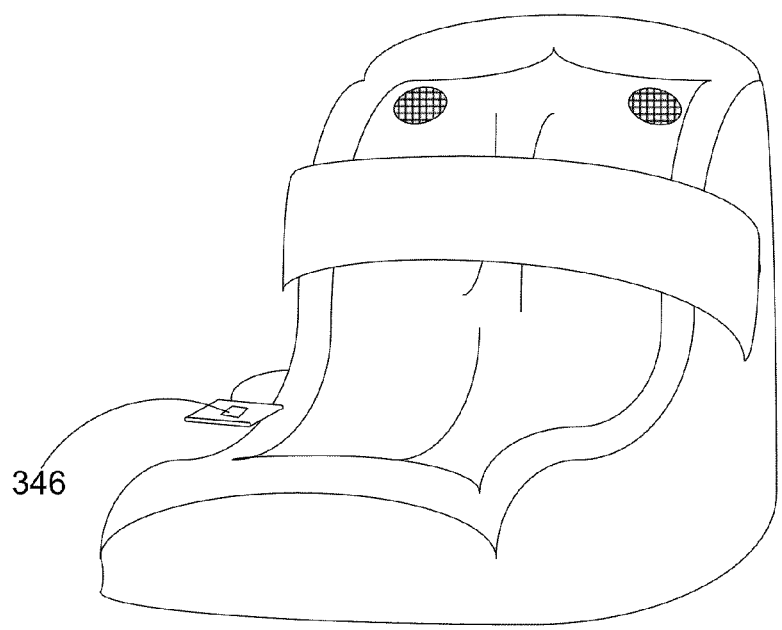
FIG. 5D is a front perspective illustration of a child's car seat assembly having a touchpad attached to the car seat assembly.
Figure 5E:
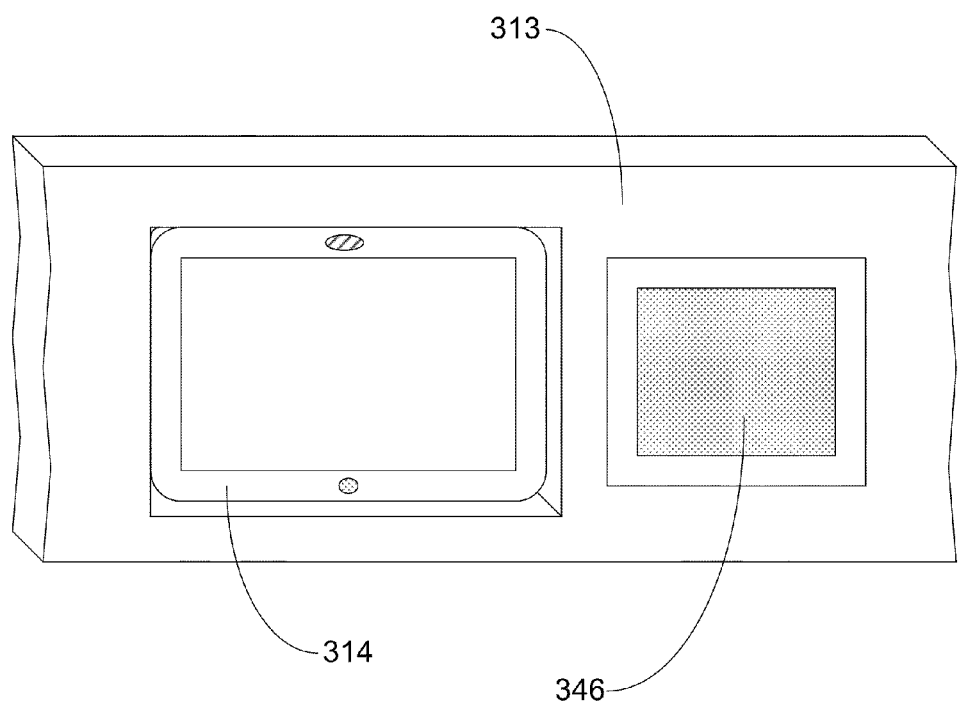
FIG. 5E is a fragmented illustration of a touchpad attached to a cross bar of a child's car seat assembly.
Figure 5F:
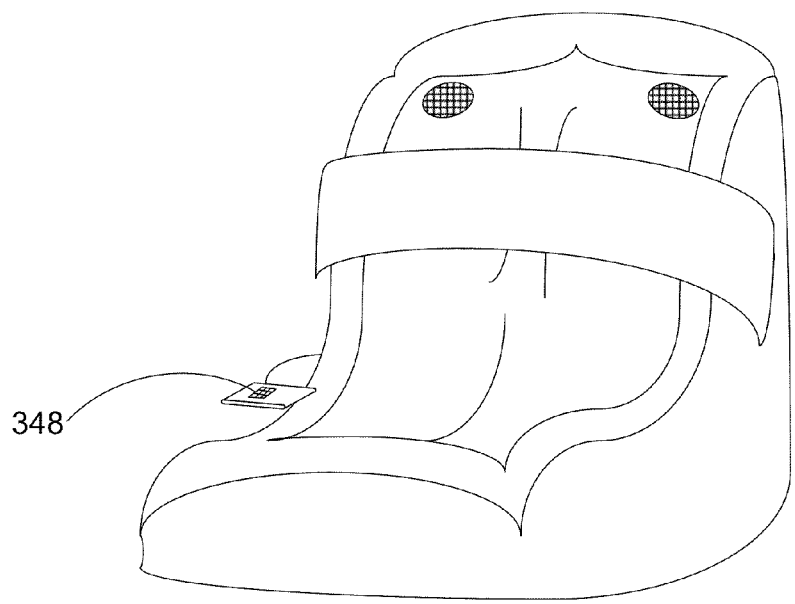
FIG. 5F is a front perspective illustration of a child's car seat assembly having a numerical keypad attached to the car seat assembly.
Figure 5G:
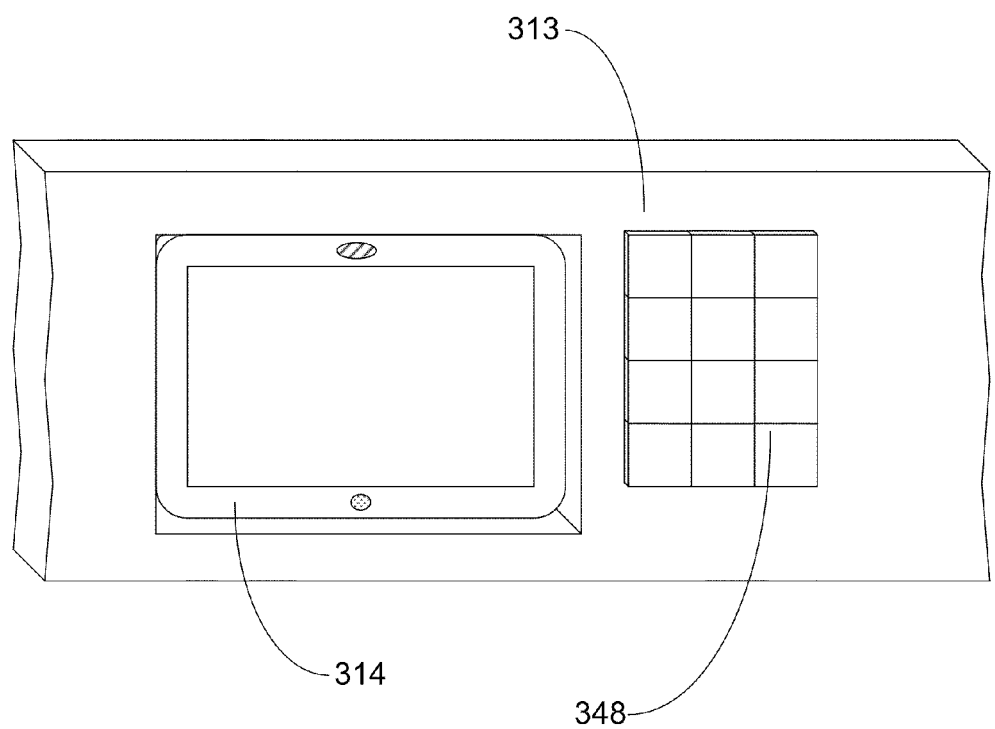
FIG. 5G is a fragmented illustration of a numerical keypad attached to a cross bar of a child's car seat assembly.

Additionally, it is contemplated that a mouse, keyboard, numerical keypad, or other remote controller may be utilized to control a console 314 in accordance with a preferred embodiment of the present invention. Any of these input devices may be included in the console 314, or may be mounted in a car seat assembly 310, separately from the console 314. FIG. 5A illustrates how a mousing surface 342 may be attached to the car seat assembly 310 such that a mouse 342 may be used. The mouse 342 may be connected to the console 314 wirelessly, or it may be connected with a cord or cable. FIG. 5B illustrates how a trackball 344 may be attached to the car seat assembly 310. The trackball 344 may be connected to the console 314 wirelessly, or it may be connected with a cord or cable. FIG. 5C illustrates how a trackball 344 may be attached to a cross arm 313 of the car seat assembly 310. FIG. 5D illustrates how a touchpad 346 may be attached to the car seat assembly 310. The touchpad 346 may be connected to the console 314 wirelessly, or it may be connected with a cord or cable. FIG. 5E illustrates how a trackball 346 may be attached to the cross arm 313 of the car seat assembly 310. FIG. 5F illustrates how a numeric keypad 348 may be attached to the car seat assembly 310. The numeric keypad 348 may be connected to the console 314 wirelessly, or it may be connected with a cord or cable. FIG. 5G illustrates how a numeric keypad 348 may be attached to the cross arm 313 of the car seat assembly 310. It is contemplated that a numerical keypad could be used for the communication function of the car seat assembly 310, in particular, to make phone calls.

In one or more preferred implementations, voice recognition is utilized. For example, in a preferred implementation, voice recognition gaming is supported.

In at least some preferred implementations, one or more accelerometers are utilized. For example, an accelerometer component may be disposed on a child's wrist for use in gaming applications, or use with general control functionality. In such event, one or more accelerometers may be utilized to detect when a child claps his or her hands.

Figure 6:
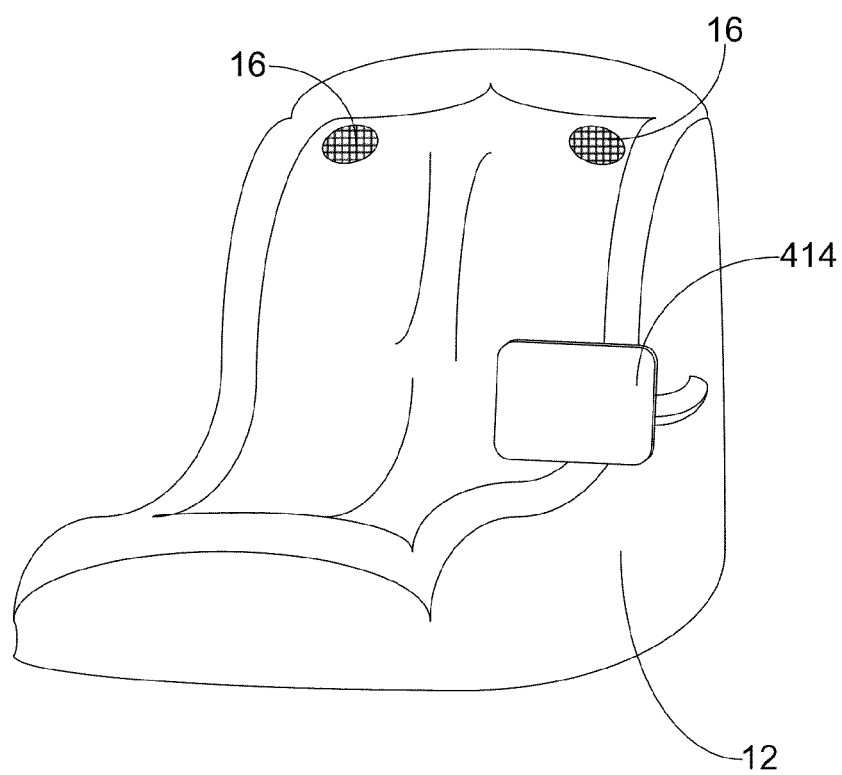
FIG. 6 is a perspective illustration of a child's car seat assembly in accordance with another preferred embodiment of the present invention.

FIG. 6 is a perspective view of a child's car seat assembly 410 in accordance with a preferred embodiment of the present invention. As can be seen in FIG. 6, the console 414 is disposed in a side arm of the car seat assembly 410. Alternatively, the console 414 may be located in or on other components of the car seat assembly 410 as long as it is easily accessible and viewable to the occupant of the car seat assembly 410. Further, the console 414 may include the same features and functionality regardless of where it is located in the car seat assembly 410. Disclosure of placement and functionality of the console 414 contained herein is exemplary in nature only. Further, placement and functionality of the console 414 should not be limited by any disclosure contained herein.

Hereinabove have been described multiple embodiments of the console 14,114,214,314 in accordance with various embodiments of the present invention. Hereinbelow, the console 14 shall be referred to, but all features and implementations described with reference to the console 14 could also be implemented or featured with respect to the consoles 114, 214,314. Likewise, all features and implementations described with reference to the car seat assembly 10, could be implemented or featured with respect to the car seat assemblies 310,410.

Figure 7:
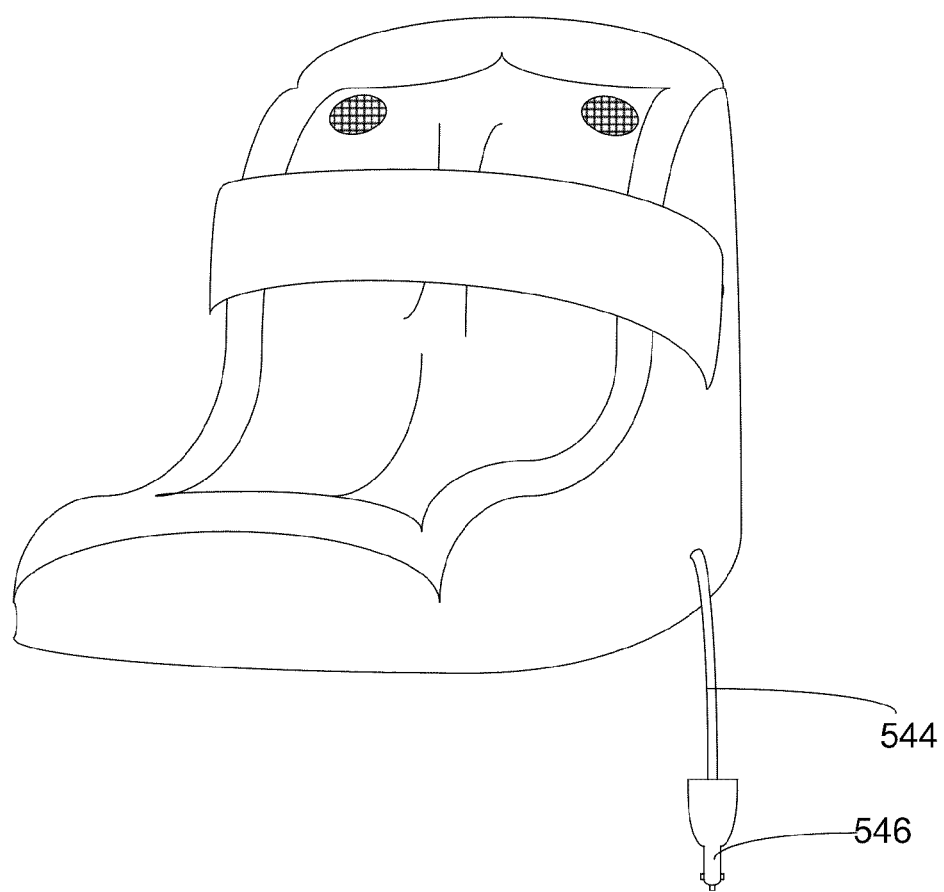
FIG. 7 is a perspective illustration of a child's car seat assembly that includes a power cord having an end plug configured to be inserted into a standard automobile power outlet/cigarette lighter holder.

FIG. 7 is a perspective illustration of the car seat assembly 10 that includes a power cord 544 having an end plug 546 configured to be inserted into a standard automobile power outlet/cigarette lighter holder. When the end plug 546 is inserted into a standard automobile power outlet, power will be provided to the car seat assembly 10.

Figure 8:
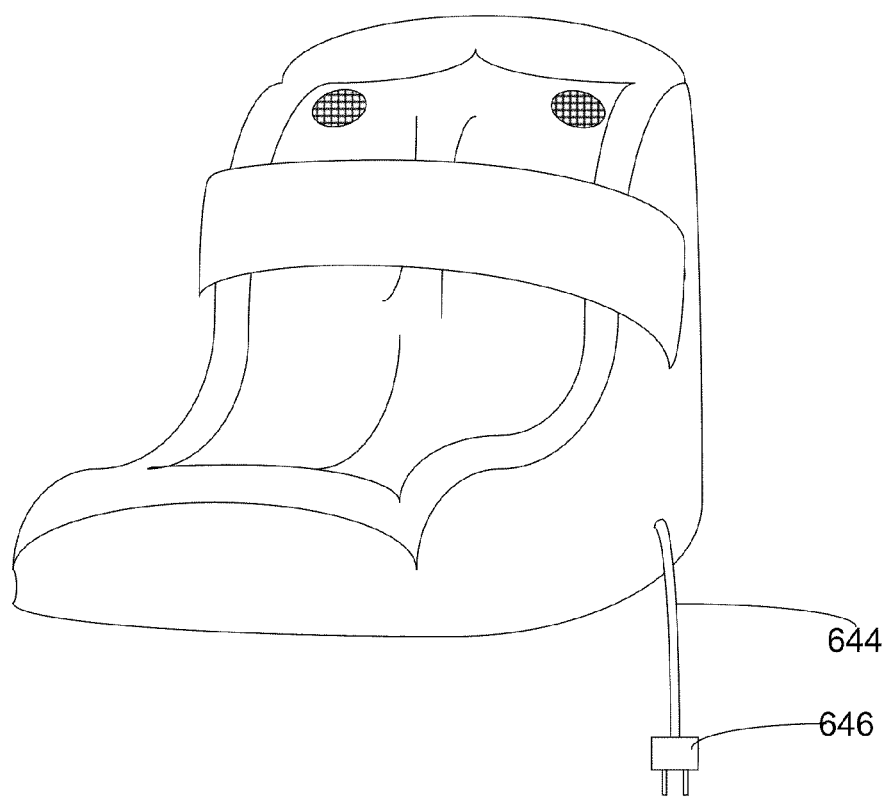
FIG. 8 is a perspective view of a child's car seat assembly that includes a power cord having an end plug configured to be inserted into a standard electrical socket.

FIG. 8 is a perspective illustration of a car seat assembly 10 that includes a power cord 644 having an end plug 646 configured to be inserted into a standard electrical socket. When the end plug 646 is inserted into a standard electrical outlet, power will be provided to the car seat assembly 10.

Figure 9:
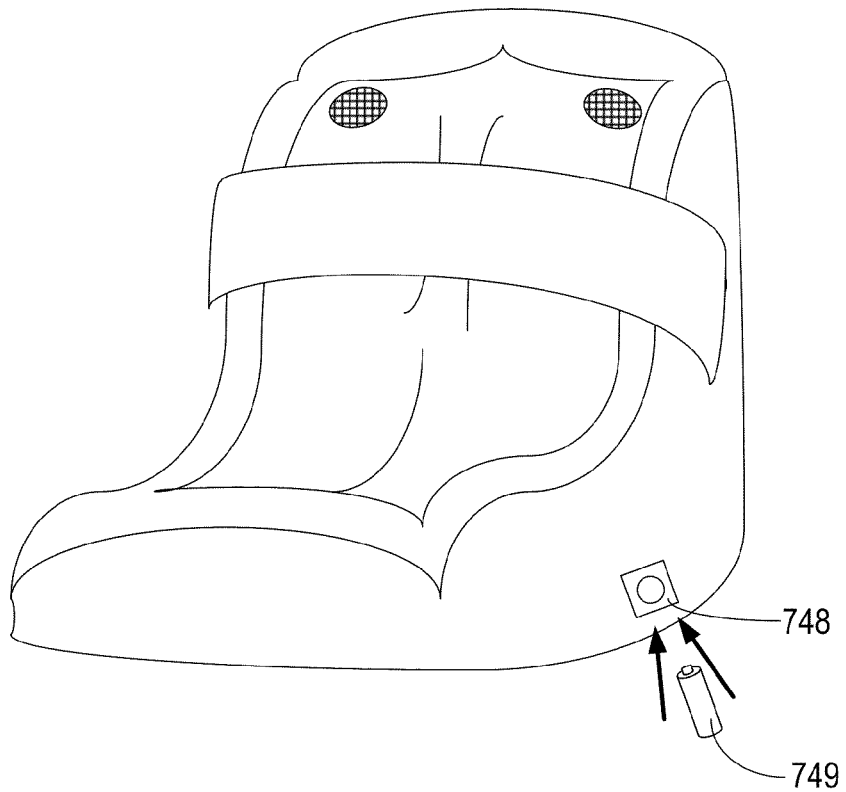
FIG. 9 is a perspective view of a car seat assembly that includes an easily accessible battery housing into which one or more batteries may be inserted to provide power to the car seat assembly.

FIG. 9 is a perspective illustration of a car seat assembly 10 that includes an easily accessible battery housing 748, into which one or more batteries 749 may be inserted to provide power to the car seat assembly 10.

Figure 10:
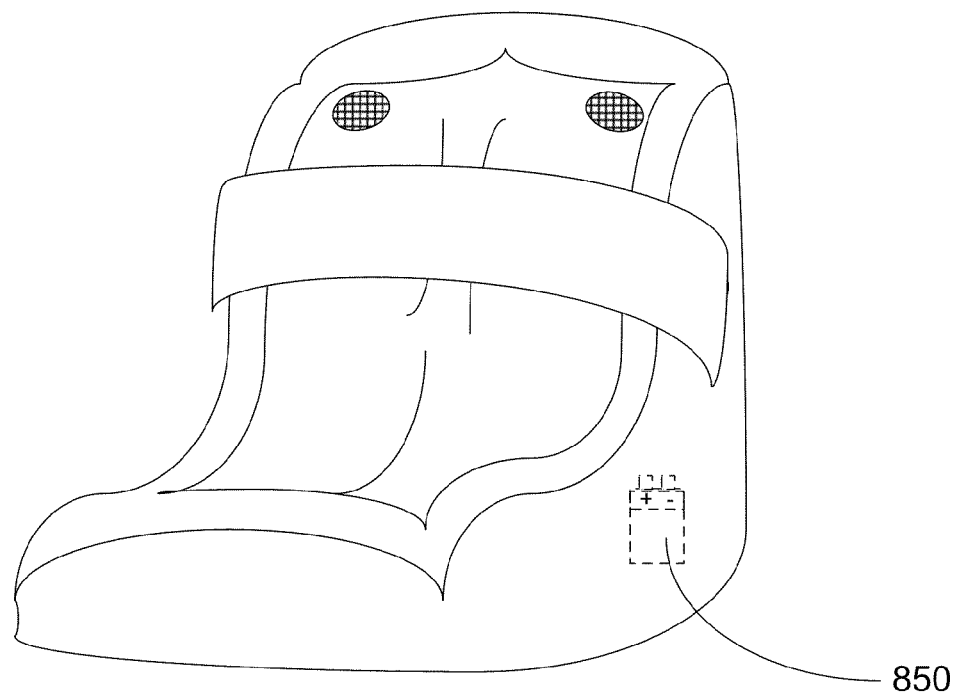
FIG. 10 is a perspective view of a car seat assembly that includes an internal battery, which may be rechargeable.

FIG. 10 is a perspective illustration of a car seat assembly 10 that includes an internal battery 850, which may be rechargeable.

The car seat assembly 10 is installed in an automobile in the same manner as a conventional car seat. The assembly 10 includes the same safety features as conventional car seats and therefore meets the National Highway Traffic Safety Administration (NHTSA) requirements. For instance, the car seat assembly 10 includes the conventional five point safety harness that is present in conventional car seats.

As will be appreciated, an occupant in one car seat assembly 10 is not limited by the media selections of an occupant in another car seat assembly 10, whether or not the car seat assemblies 10 are installed in the same car. For example, if two children are seated in identical car seat assemblies 10 in the same car, each child is able to independently select what he or she would like to view and/or play on his or her console 14. Thus, one child may choose to view, using his respective console 14, any desired video as selected from available media, and the other child may choose to view, using his respective console, any desired video as selected from available media.

The communication of the media content transmitted to the console 14 may be accomplished through various different system architectures. Furthermore, while one or more such system architectures form an aspect of the invention, the broader scope of the invention is intended to be generic to the particular architecture that is employed.

Figure 11A:
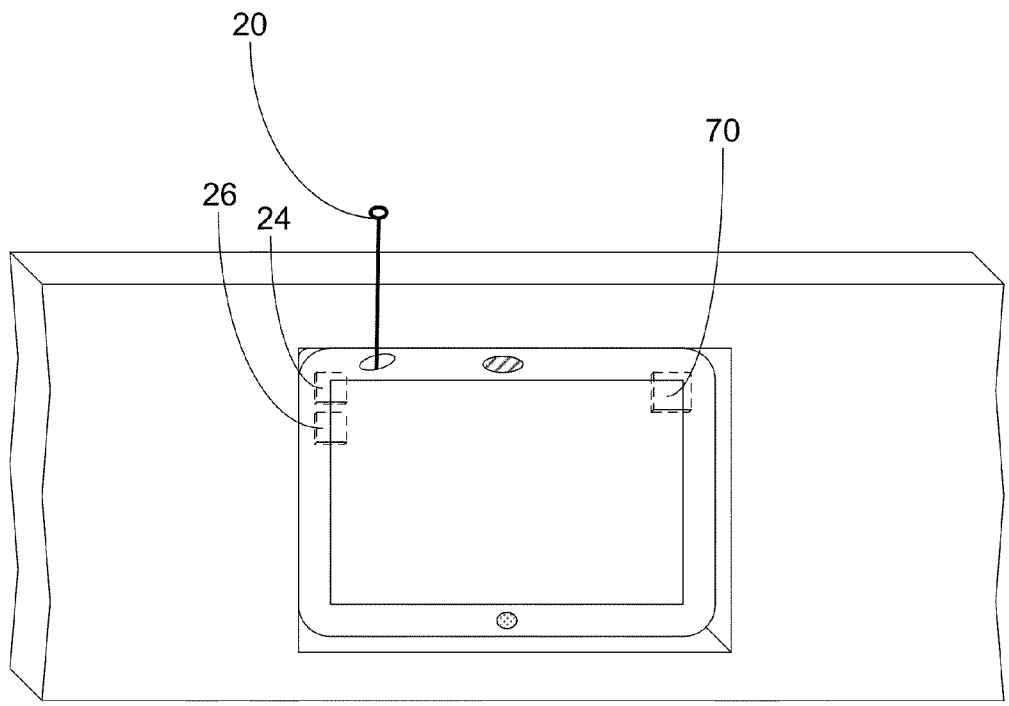
FIG. 11A is a fragmented illustration of a console having a transmitter, a receiver, an antenna, and a processing unit.
Figure 11B:
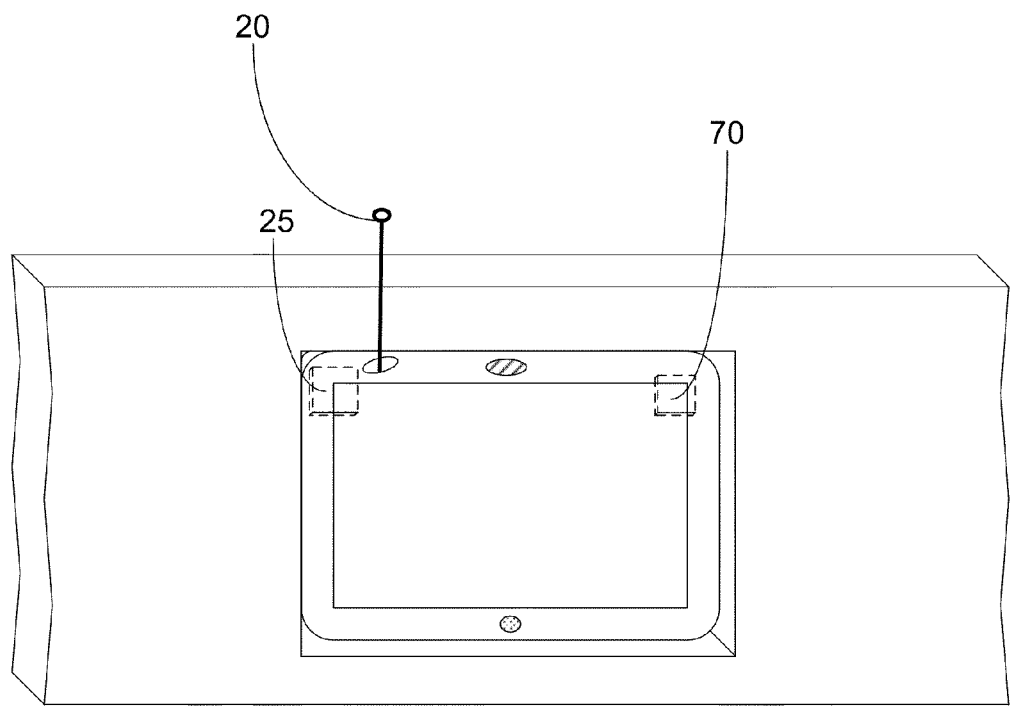
FIG. 11B is a fragmented illustration of a console having a transceiver, an antenna, and a processing unit.

In one particular system architecture, the media is received at the console 14. As can be seen in FIG. 11A, the console 14 preferably include a wireless receiver 24 for wirelessly receiving media and communication signals. Alternatively, the console 14 may include a wireless transceiver 25, as shown in FIG. 11B.

Preferably, the console 14 also includes a wireless transmitter 26, as shown in FIG. 11A. Alternatively, the console 14 may include a wireless transceiver 25, as shown in FIG. 11B.

When such a wireless receiver 24, transmitter 26 or transceiver 25 is utilized, the console 14 may be further equipped with an antenna 20 (schematically represented) and/or appropriate amplification to improve reception of the wireless signals. Reception may be further improved through the use of repeaters (not illustrated) stationed in appropriate locations around the venue.

The console 14 may also include a processing unit 70 for locally executing software. Alternatively, the one or more wireless receivers 24, transmitters 26 or transceivers 25, and the processing unit 70 may be located in another part or section of the car seat assembly 10.

The console 14 provides centralized and controlled distribution of media content. Several exemplary distribution technologies are schematically illustrated, at least partially, in the various drawings, but it will be apparent to the Ordinary Artisan that other distribution technologies may likewise be utilized in at least some embodiments of the present invention.

Figure 12A:
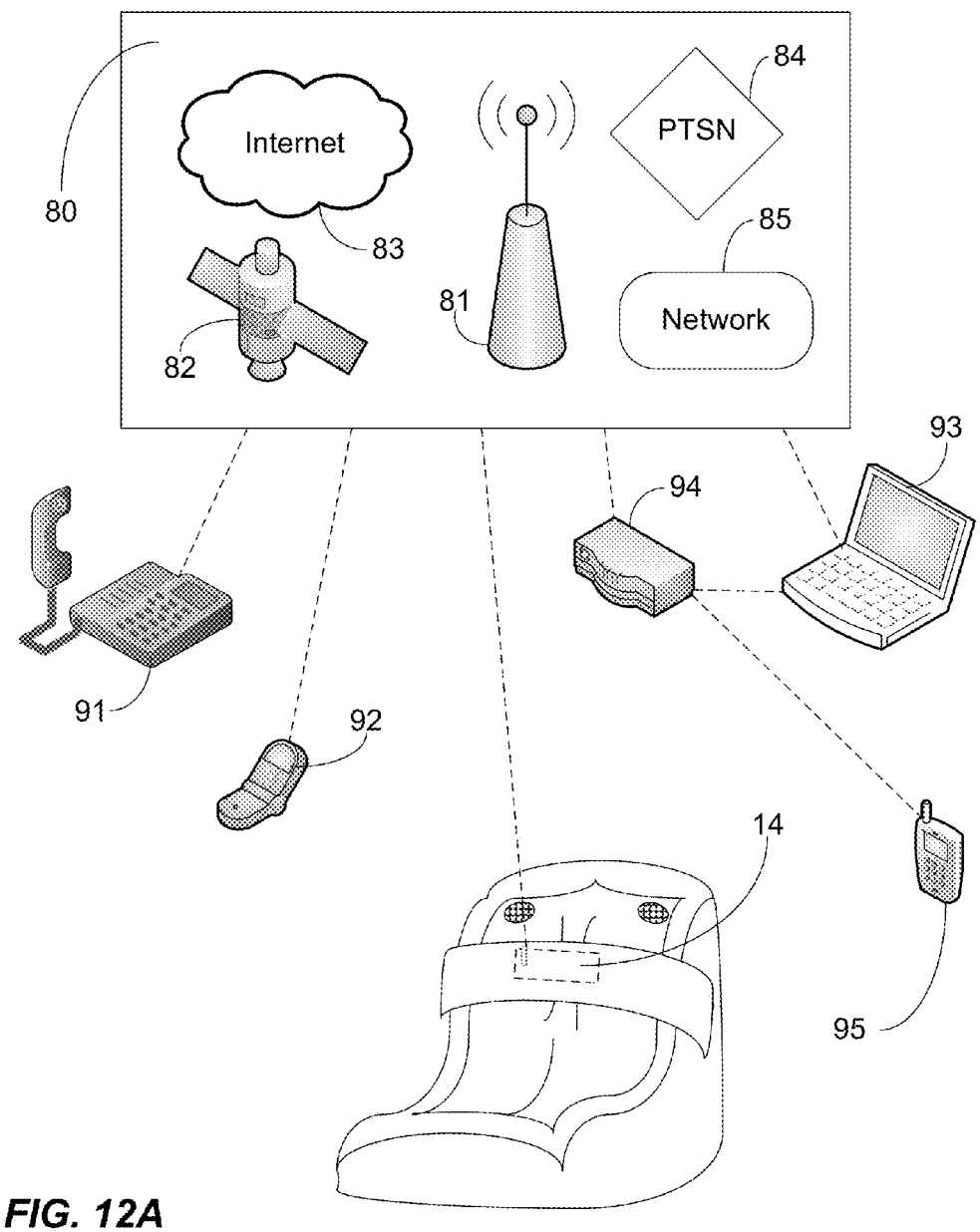
FIG. 12A is a schematic illustration of possible communication configurations for use with a child's car seat assembly in accordance with one or more embodiments of the present invention.
Figure 12B:
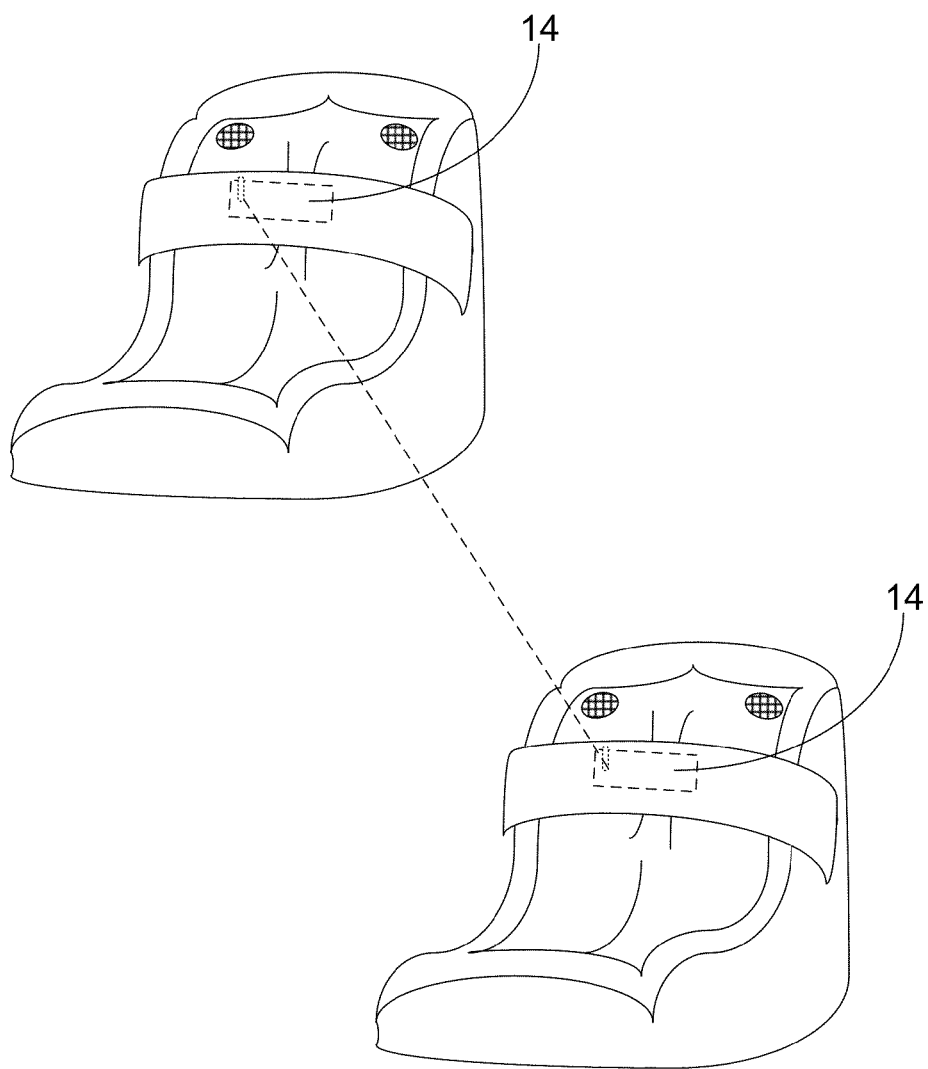
FIG. 12B is a schematic illustration of two consoles in communication with each other.

FIG. 12A is a schematic illustration of a console 14 in communication with a variety of distribution technologies 80, including a communications antenna or tower 81, a satellite 82, the Internet 83, a public telephone switched network (PTSN) 84, and a network 85. Through these distribution technologies 80, the console 14 may be in communication with a telephone 91, a cellular phone 92, a computer 93, a wireless modem or other wireless communication device or network element 94, a VoIP phone 95, or any component connected to a WiFi, WiMax, 802.11 or 902.11 compatible, or Bluetooth network. With particular regard to the communications antenna or tower 28, it will be recognized that such an arrangement may be used in conjunction with conventional cellular technology, another conventional technology, or a proprietary technology. As can be seen in FIG. 12B, the console 14 may be communicatively connected to another console 14, either wirelessly or with a cord or cable. In one or more preferred implementations, a console may be configured to communicate with a cellular phone or other network device that can then further communicate information. For example, a console in a vehicle may be configured to communicate, via a Bluetooth connection, with a cellular phone located in the vehicle, which is configured to further communicate such communication externally to the vehicle.

In use, wireless or wired communications may be effected between a console located in a vehicle and one or more other devices located in the same vehicle. For example, point to point wireless communications may occur between a console located in the back seat of a vehicle and one or more communications components disposed in the front of the same vehicle. In at least some implementations, video communicated from a console may be displayed in a display screen disposed in or on a dashboard of the vehicle, such as, for example, a display screen that is capable of displaying GPS mapping information. In one or more implementations, such a display screen is disposed in or on a rear view mirror of the vehicle.

In at least some preferred implementations, two car seat assemblies may be disposed in the same vehicle. In one or more preferred implementations, such car seat assemblies are configured for communications with a device disposed in a front seat of the vehicle, and the device includes toggle functionality for toggling between communications with each of the car seat assemblies.

Figure 13:
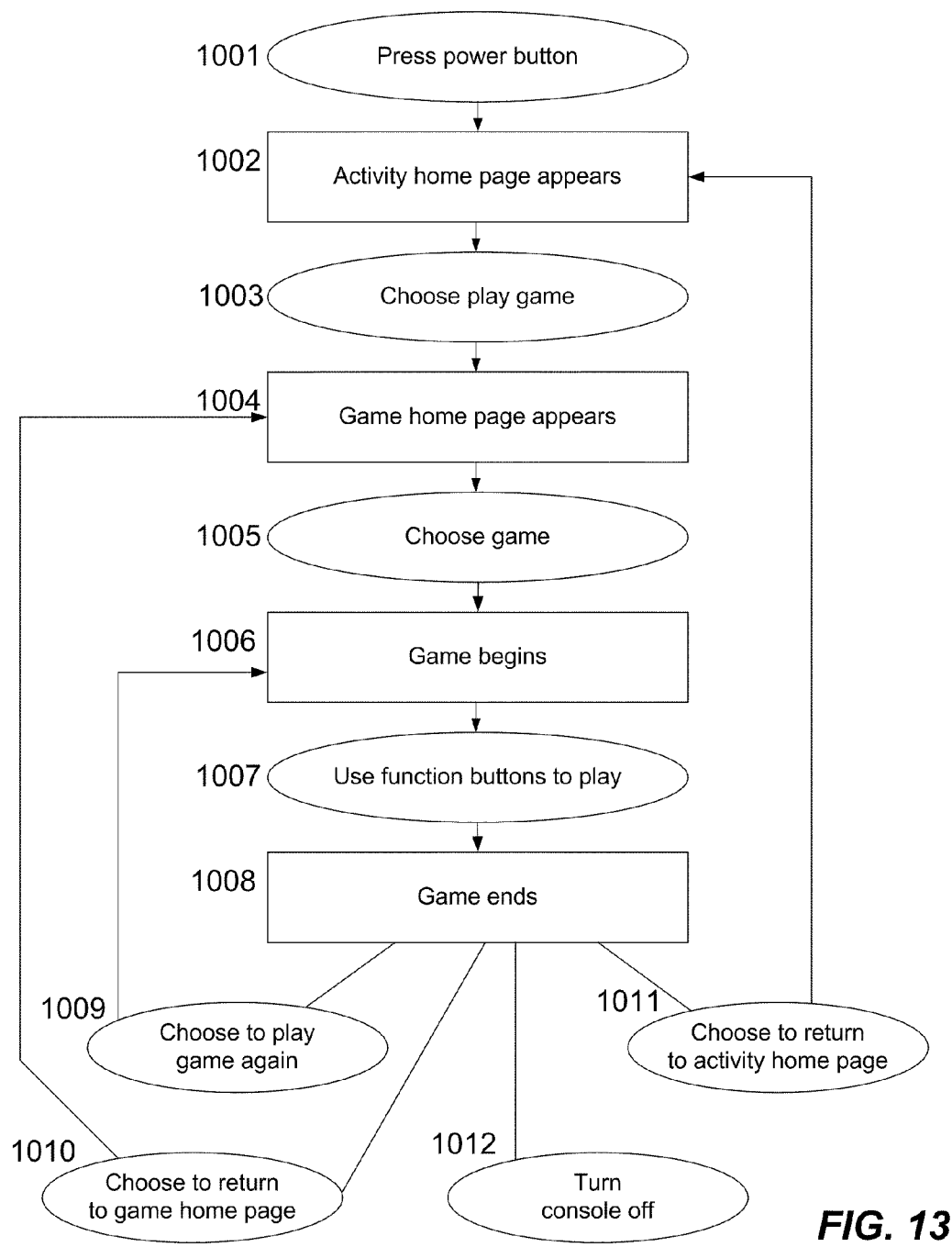
FIG. 13 is a flowchart of an exemplary scenario for using the console to play a video game.

In use, a child seated in the car seat assembly 10 may desire to play a video game while riding in the car seat assembly 10. FIG. 13 provides an exemplary scenario, 1000, for using the console 14 to play a video game. At step 1001, the child presses a "power" button of the console 14 to turn the console 14 on. It is contemplated that a "power" button may be of a particular color or shape that may be easily designated and remembered, e.g., green or a triangle, so that a child who cannot read may be able to remember the button to press to power the console 14 and therefore be able to easily use the console 14. At step 1002, an activity home page providing a list of available activities appears on a display 34 of the console 14. It is contemplated that a picture or icon that identifies each of the listed activities will appear beside the name of the activity so that younger children who cannot read are able to use the console. At step 1003, the child chooses the activity that he wishes to perform by pressing the button 36 that corresponds to the selected activity, e.g., the button 36 that corresponds to "play a game." In embodiments utilizing the touch screen console 114, it is contemplated that touch screen controls may enable the child to touch the picture or icon of the activity he wishes to play on the monitor 234. At step 1004, a game home page providing a list of available video games appears on the monitor 34. It is contemplated that a picture or icon that identifies each of the listed games will appear beside the name of the game so that younger children who cannot read are able to use the game function of the console 14. At step 1005, the child presses the button 36 that corresponds to the game that he wishes to play. In embodiments utilizing the touch screen console 114, it is contemplated that touch screen controls may enable the child to touch the picture or icon of the game he wishes to play on the monitor 34. As indicated at step 1006, once the child has selected a game, the action of the game begins on the display 34. At step 107, the child uses the control buttons 36 of the console 14 to play the game. Depending on the game selected, different control buttons 36 of the available control buttons 36 may be needed. Additionally, depending on the game selected, available control buttons 36 may have different functionality.

It is contemplated that the console 14 may be used by the car seat assembly 10 child to play single player games and also to play multiplayer games. For example, the child may play a multiplayer game with another person riding in the car with him, e.g., an child of another car seat assembly 10 installed in the same car, or may play a multiplayer game with a person at a location remote from the car in which the child is riding, e.g., a player on his home PC.

As indicated at step 1008, the game ends, and the child has several options for continuing. As indicated at step 1009, the child may choose to play the game again. Alternatively, at step 1010, the child may press a "home" button (or another button with similar functionality) to return to the game home page. He may select another game to play or, as indicated in step 1011, he may press the "home" button again to return to the activity home page to select another activity. Alternatively, as indicated at step 1012, he may press the "power" button if he wishes to turn the console 14 off. The power button may be pressed at any time to turn the console 14 on or off, depending on its current status.

Figure 14:
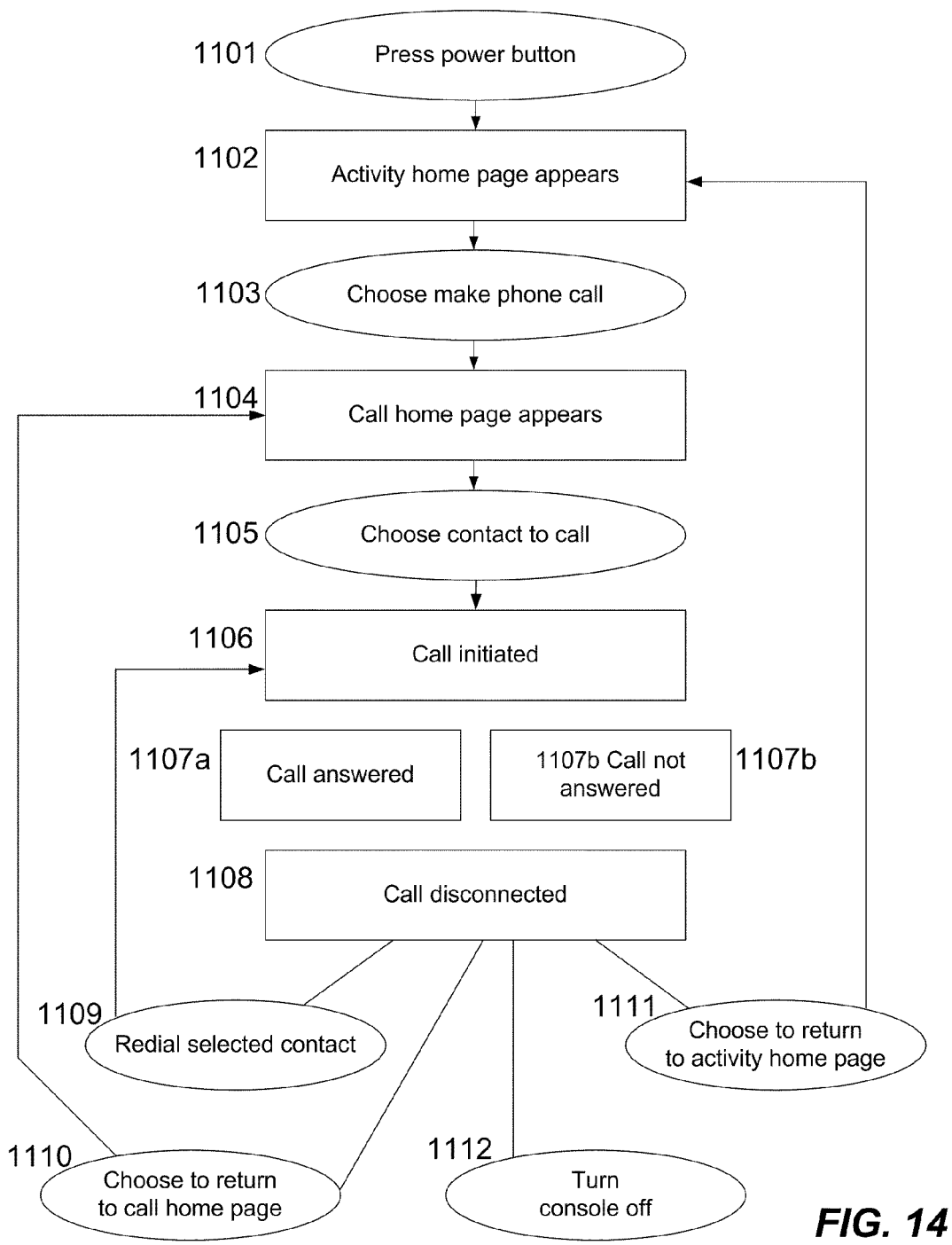
FIG. 14 is a flowchart of an exemplary scenario for using the console to make a phone call.

An child seated in the car seat assembly 10 may desire to make a phone call. FIG. 14 provides an exemplary scenario, 2000, of this activity. At step 2001, the child presses the "power" button of the console 14 to turn the console 14 on. At step 2002, an activity home page providing a list of desired activities appears on the monitor 34. At step 2003, the child chooses the activity that he wishes to perform by pressing the button that corresponds to the selected activity, e.g., the button that corresponds to "make a call." At step 2004, a telephone call home page appears providing a contact list of predetermined contacts, e.g., mom, dad, grandparent, doctor, emergency (911), etc. It is contemplated that a picture of the person listed as a contact will appear beside the contact name so that younger children who cannot read are able to use the call function of the console. At step 2005, the child selects the person or place from the list that he wishes to call by pressing the function button corresponding to the desired contact. In embodiments utilizing a touch screen console 114, it is contemplated that touch screen controls may enable the child to touch the name or picture of the person he desires to call on the monitor. At step 2006, the console automatically dials the number associated with the contact. The speaker and microphone of the car seat assembly enable the car seat assembly child and the person that answers the call to communicate with one another. If the person being called answers the call, as indicated at step 2007a, the console may be programmed to automatically disconnect once the person being called disconnects, as indicated at step 2008. This functionality hinders the child from accidentally disconnecting a call. If no one answers the call, as indicated at step 2007b, the child may disconnect the call, as indicated at step 2008. Alternatively, the console may be programmed to end an attempted call after a predetermined number of rings. In addition, it is contemplated that the console may have emergency contact buttons that are preprogrammed to call selected emergency contacts, e.g., 911, mom, dad, etc. These buttons would be located directly on the console or another easily accessible location and would not have any other functionality than being emergency contact buttons. The child could press these buttons at any time and the emergency contact would be called immediately. After the call is disconnected, the child has a number of options. At step 2009, the child may press a redial button to call the same contact again. At step 2010, the child may press a "home" button to return to the home page of the call function. Further, at step 2011, the child may press the "home" button again to return to the main selection menu. Additionally, as indicated at step 2012, the child may press the power button again to turn the console off. The power button may be pressed at any time to turn the console 14 on or off, depending on its current status.

The use scenarios provided herein are exemplary in nature only. The use and function of the console 14 and the car seat assembly 10 should not be limited in any way by the description of their use provided herein.

Figure 15:
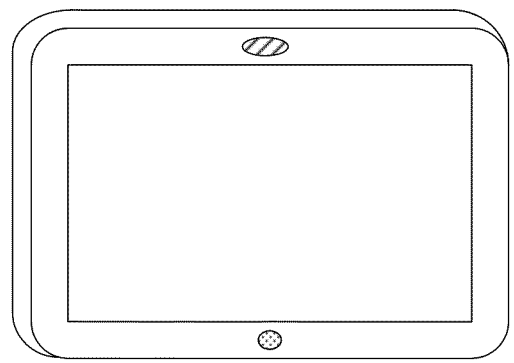

In at least some preferred implementations, an electronic device possessing functionality described herein is configured for attachment to a child's car seat. For example, a device may be configured for snap fit, or other, engagement with a particular brand of child's car seat, or may be configured for snap fit, or other, engagement with a wide variety of brands of child's car seats. FIG. 15 illustrates an exemplary electronic device 910 which comprises a microphone, speaker, and touchscreen display, as well as communication components (not illustrated). The electronic device 910 is configured for attachment to a child's car seat, either alone or with use of one or more connection members.

In at least some preferred implementations, a child's car seat assembly or electronic device is configured for use in, with, or as a forward-facing car seat, while in at least some other preferred implementations a child's car seat assembly or electronic device is configured for use in, with, or as a rear-facing car seat. In at least some preferred implementations, an electronic device is configured to be moveable from a child's car seat for a younger child, e.g. a rear-facing seat, to a child's car seat for an older child, e.g. a forward-facing seat.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A child's car seat assembly comprising:
   (a) a car seat, and
   (b) an electronic device incorporated into a cross bar of the car seat, the electronic device comprising
      (i) a camera,
      (ii) a microphone,
      (iii) communication components that enable wireless gaming applications to be played by a child who is retained in the car seat assembly and that enable two-way audio-video communications between a child retained in the car seat assembly and another person, and
      (iv) a touchscreen display displaying a graphical user interface including a button comprising a picture of a child's parent, the button being configured to initiate two-way audio-video communications with the child's parent via the communication components.

2. The child's car seat assembly of claim 1, wherein the electronic device is configured to connect to a nearby communications device for forwarding of communications from the electronic device.

3. The child's car seat assembly of claim 2, wherein the electronic device is configured to automatically connect, via Bluetooth, to a nearby cell phone for forwarding of communications from the electronic device.

4. A system, comprising:
   (a) a car seat disposed in a vehicle;
   (b) a first electronic device incorporated into a cross bar of the car seat, the first electronic device comprising
      (i) a camera,
      (ii) a microphone,
      (iii) communication components that enable wireless gaming applications to be played by a child who is retained in the car seat and that enable two-way audio-video communications, and
      (iv) a touchscreen display displaying a graphical user interface including a button comprising a picture of a child's parent, the button being configured to initiate two-way audio-video communications with the child's parent via the communication components; and
   (c) a second electronic device disposed in the front of the vehicle, the second electronic device being configured for two-way audio-video communications with the first electronic device.

5. The system of claim 4, further comprising an electronic display disposed in the front of the vehicle configured to display a video image communicated from the first electronic device.

6. The system of claim 5, wherein the electronic display is configured to display a map based at least in part on GPS data.

7. The system of claim 5, wherein the electronic display is disposed on or in a dashboard of the vehicle.

8. The system of claim 5, wherein the electronic display is disposed on or in a rear-view mirror of the vehicle.

9. The system of claim 4, wherein the two-way communications comprise point to point communications.

10. An electronic device for a child's car seat assembly, the electronic device comprising
    (a) a camera;
    (b) a microphone;
    (c) communication components that enable
       (i) wireless gaming applications to be played by a child utilizing the electronic device, and
       (ii) two-way audio-video communications between a child utilizing the electronic device and another person; and
    (d) one or more attachment components configured to attach the electronic device to a child's car seat;
    (e) a touchscreen display displaying a graphical user interface including a button comprising a picture of a child's parent, the button being configured to initiate two-way audio-video communications with the child's parent via the communication components.

* * * * *